(12) United States Patent
De Salaberry

(10) Patent No.: US 6,443,009 B1
(45) Date of Patent: Sep. 3, 2002

(54) VIBRATING GYROSCOPE WITH ELECTROMAGNETIC EXCITATION AND DETECTION

(76) Inventor: Bernard De Salaberry, 4bis rue de la Ceinture, 78000 Versailles (FR)

( * ) Notice: Subject to any disclaimer, the term of this patent is extended or adjusted under 35 U.S.C. 154(b) by 0 days.

(21) Appl. No.: 09/509,340

(22) PCT Filed: Sep. 25, 1998

(86) PCT No.: PCT/FR98/02060
§ 371 (c)(1),
(2), (4) Date: Mar. 24, 2000

(87) PCT Pub. No.: WO99/17078
PCT Pub. Date: Apr. 8, 1999

(30) Foreign Application Priority Data

Sep. 30, 1997 (FR) .......................... 97 12129

(51) Int. Cl.⁷ ................................. G01P 9/04
(52) U.S. Cl. .................................. 73/504.13
(58) Field of Search .................. 73/504.13, 504.12

(56) References Cited

U.S. PATENT DOCUMENTS 4,793,195 A * 12/1988 Koning ..................... 73/504.13
5,932,804 A * 8/1999 Hopkin et al. ............ 73/504.13

FOREIGN PATENT DOCUMENTS

FR          2739189      *  3/1997

* cited by examiner

Primary Examiner—John E. Chapman
(74) Attorney, Agent, or Firm—William A. Drucker

(57) ABSTRACT

The invention concerns a vibrating gyro-scope comprising a vibrating cylinder (1) magnetically excited by an internal stator (9) and whereof the vibrations are detected by means of the same stator comprising field coils and separate or common or multiplexed detection coils. The resulting gyroscope is very accurate while being economical and simple to produce. The invention is useful for measuring angular speed

10 Claims, 5 Drawing Sheets

10a  10b

VIBRATING GYROSCOPE WITH ELECTROMAGNETIC EXCITATION AND DETECTION

BACKGROUND OF THE INVENTION

1. Field of the Invention

This invention relates to a vibrating gyroscope for the accurate measurement of angular speed within a wide measurement range. This gyroscope has the advantage over techniques usually used of being simpler to use and therefore of being inexpensive while remaining accurate and requiring little space.

2. Description of the Prior Art

Vibrating gyroscopes are based on the action of the Coriolis forces caused by a rotation imposed on masses in motion.

Several embodiments have been proposed in the past for the production of a vibrating element sensitive to angular speed.

The method most frequently used consists in vibrating a cylindrical or hemispherical test piece perpendicularly to its axis, and in observing the vibration nodes when it is subjected to rotation about said axis.

The main difficulties stem from the means used to create and measure the vibration.

The solutions proposed to date for the creation of the vibration have mainly been of an electromagnetic, electrostatic or piezoelectric nature.

The main drawback of electrostatic solutions is that they require high electric voltages and, in order to be efficient, very small air gaps. To avoid arc ignition, the assembly must be in a vacuum which, in addition to the machining accuracy needed, is a very costly requirement.

The piezoelectric solutions use either a cylinder, entirely in piezoelectric material, or small piezoelectric elements mounted usually by bonding, onto a metal cylinder.

The use of small piezoelectric elements mounted onto a metal cylinder enables costs to be reduced somewhat, but hardly any improvement is made to performance due to the crossfeed caused by the masses of said ceramics located on particular points of the cylinder.

Another major difficulty with all these solutions resides in the fact that the detection signals are of very low electrical level and that it is very difficult to protect them from low-level excitation signals within the same frequency band. For this reason, the means for detecting and exciting the vibrations are usually of a different nature and, insofar as possible, far apart from one another.

U.S. Pat. No. 4,793,195 describes e.g. a vibrating cylinder gyroscope equipped with electrostatic detection and is magnetically excited at a frequency half that of its vibration frequency in order to reduce these effects.

French patent application No. 95/11211 describes a gyroscope with magnetic excitation and optical detection also well protected from the excitation signals.

OBJECT OF THE INVENTION

This invention introduces a simplification to this latter type of gyroscope by suppressing the optical detection means and by using the electromagnetic excitation device itself to perform detection. Separation of the excitation and detection signals is achieved, on the one hand, by using an excitation at half frequency and, on the other hand, by distributing the polarisations and directions of winding so as to cancel interaction between excitation and detection. Another embodiment using multiplexing enables this separation to be further enhanced. The accuracy of the gyroscope obtained depends solely on the precision of highly conventional and therefore inexpensive mechanical machining as well as on electronic parameters that are easily mastered. This solution thus has the advantage of being even more economical.

SUMMARY OF THE INVENTION

The invention thus relates to a vibrating gyroscope of the type comprising:

a thin vibrating element generated by revolution, an excitation means enabling the generation of vibrations at at least one point of the vibrating element so as to cause to appear, on said vibrating element, a succession of vibration nodes and bulges susceptible of moving under the effects of an angular speed of rotation, and a means for detecting said vibrations, disposed so as to be able to detect said nodes and/or said bulges, characterized in that said excitation and detection means are both electromagnetic and made from the same electromagnetic assembly common to both the excitation and detection functions.

Embodiments of the invention will now be described, by way of non-limiting examples, in reference to the appended drawings in which:

DETAILED DESCRIPTION OF THE PREFERRED EMBODIMENTS

Figure 1:
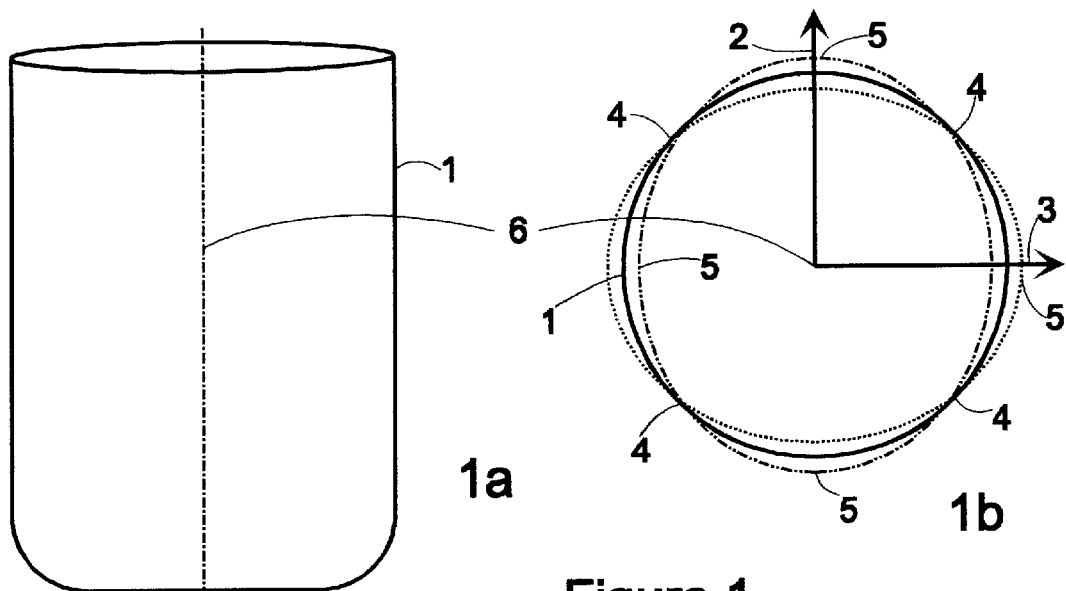
FIG. 1 is a skeleton diagram showing the operation of a vibrating gyroscope.

As previously mentioned, and as shown in FIG. 1, a vibrating gyroscope comprises a test piece 1, having an axis of symmetry 6, e.g. cylindrical (FIG. 1a), but which can be flat or of any other shape, and which is vibrationally excited (FIG. 1b) in two main directions 2 and 3 perpendicular to one another and to the axis of the test piece 1, in such a way that four vibration nodes 4 and four vibration bulges 5 appear, the displacement of the parts situated on the vibration bulges being in opposition of phase for the two main directions of excitation 2 and 3.

When the test piece 1 is subjected to a rotation about an axis perpendicular to the main directions of excitation 2 and 3, the vibration nodes do not rotate with the test piece. They do not remain stationary in space either, but rotate at an angular speed which is a fraction of the angular speed of the test piece. The relation between the angular speeds of the test piece and of the vibration nodes depends on the geometry of the test piece.

The vibration nodes 4 are therefore not linked to the test piece 1 but move in relation to the latter at an angular speed proportional to the angular speed of the test piece itself.

It will thus be understood that, to produce a gyroscope capable of measuring angular speed, two problems will have to be solved: on the one hand, the vibrational excitation, and, on the other hand, the detection of the position of the vibration nodes in relation to a reference linked to the test piece.

Figure 2:
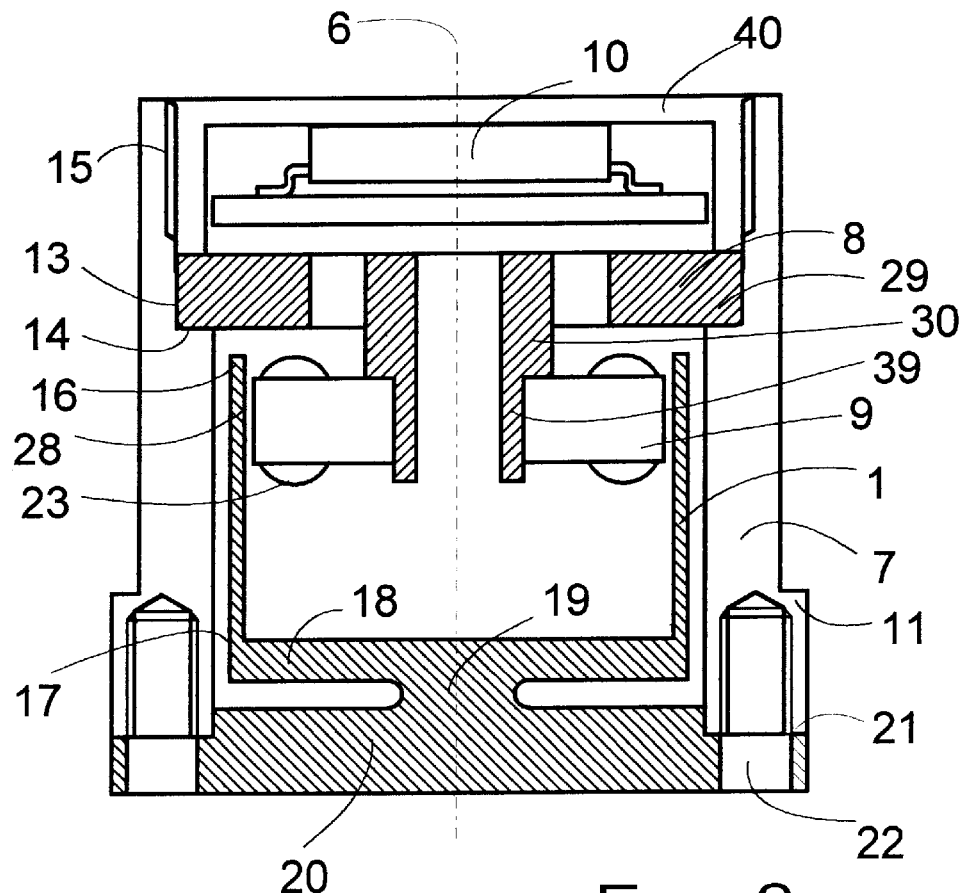
FIG. 2 is a sectional view of the vibrating gyroscope embodying the invention.

FIG. 2 shows a sectional view of a preferred embodiment of the vibrating gyroscope according to the invention, capable of obviating these problems economically.

The gyroscope comprises:

a cylindrical exterior box 7, a test piece or vibrating cylinder 1, an excitation-detection support 8, a magnetic exciter detector or stator 9, an electronic circuit 10, securing, wiring and closing means.

The exterior box 7, of open-ended cylindrical shape, comprises, at one of its ends, an extra thickness 11 in which are arranged securing holes 12 for the test piece 1.

The other end of the exterior box comprises, on the inside, a part fitted with a bore 13 of diameter slightly greater than the inside diameter of the rest of the box, said bore being connected to the inside of the cylinder 7 by means of a circular countersinking 14. This bore 13 is prolonged, at the box end side, by an internal screw thread 15.

The test piece is made in the form of a thin-walled vibrating cylinder 1, having an axis of symmetry 6, open at one of its ends 16 and closed at its other end 17 by a wall preferably thicker than those of the cylinder itself and forming a bottom 18.

Said bottom 18 is itself fixed at its centre, by a leg 19, to a circular plate 20 comprising a centring countersinking 21 as well as securing holes 22 on its periphery.

The revolving excitation-detection support 8 comprises a first part 29 of diameter such that it can be centred and brought to bear against the countersinking 14 in the bore 13 in the exterior box 7 and a second part comprising two successive diameters 30 and 39 of decreasing size, of which the second is destined to serve as a support for the magnetic stator 9 on which the coils are placed.

This support 8 thus positions itself in the bore 13 of the box 7 and bears against the countersinking 14.

It is dimensioned in such a way that the stator 9 finds itself centred in the open end 16 of the cylinder 1 while leaving as thin an air gap 28 as possible.

An outwardly threaded nut 40, screwed into the internal screw thread 15, tightens and secures the part 29 of the support 8 to the countersinking 14 in the box 7.

The magnetic exciter is preferably produced by using (FIG. 3a) sheets of metal 24 of the type used for wound rotors in electric motors. Several such sheets of metal 24 are stacked to constitute a stator 9 of diameter slightly smaller than the inside diameter of the vibrating cylinder 1. This stator comprises notches 25 separating teeth 26 around which electric windings are placed. The number of these teeth must be a multiple of four. In the case of four teeth, the latter must be angled apart by a multiple of 45 degrees, the first two teeth being separated by an angle which is an odd-numbered multiple of 45 degrees and the other two teeth also being angled apart by an odd-numbered multiple of 45 degrees. In the case of the embodiment using multiplexing, the number of teeth can be reduced to two teeth angled apart by an odd-numbered multiple of 45 degrees. In a preferred embodiment of the invention, the teeth 26 are eight in number, all spread 45 degrees apart. They are relatively narrow and prolonged by eight polar masses 27.

The windings 23 are constituted (FIG. 3b) by at least four and preferably by eight coils 31 to 38 of insulated conducting wire, each surrounding one of the teeth 26 of the stator.

These coils 31 to 38 are used for excitation and detection.

In a first embodiment of the invention, the coils fulfil the following functions two-by-two:

excitation of the vibration, EXV, detection of the vibration, DV, detection of the position of the vibration nodes, DN, automatic control of the position of the nodes, AN.

Functions EXV and DV are carried out by coils of same rank, e.g. even-numbered, functions DN and AN then being fulfilled by the coils of odd-numbered rank.

The two coils of same function can be placed at 90 or 180 degrees from one another. In order to minimize crossfeed between the excitation EXV and automatic control AN functions towards the detection functions DN and DV respectively, it is preferable to place the coils of same function at an angle of 180 degrees from one another in accordance with e.g. the distribution set forth in the table below. As the first coil of each pair, 31 to 34, is by convention wound in the positive direction, the wiring direction of the second coil of each pair, 35 to 38, is given on the third line of the table.

| Coil No. | 31 | 32 | 33 | 34 | 35 | 36 | 37 | 38 |
|---|---|---|---|---|---|---|---|---|
| Positions 1 | DN | DV | AN | EXV | DN | DV | AN | EXV |
| Winding direction | + | + | + | + | − | − | − | − |

Figure 3:
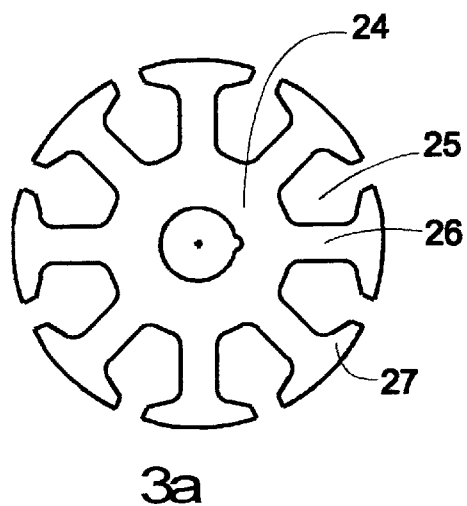
FIGS. 3 and 4 are top views of four embodiments of the magnetic circuit of the gyroscope in FIG. 2.
Figure 3:
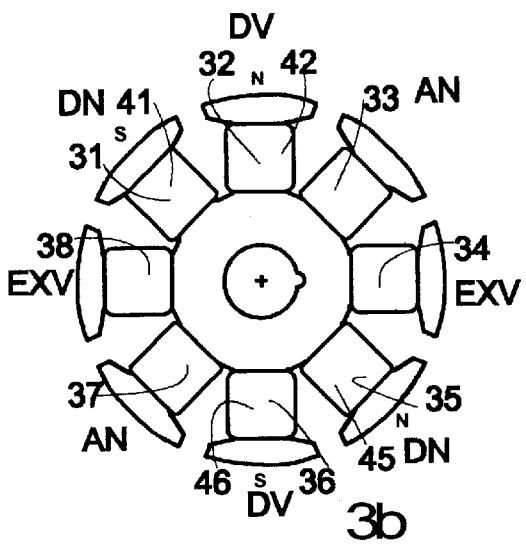
Figure 3:
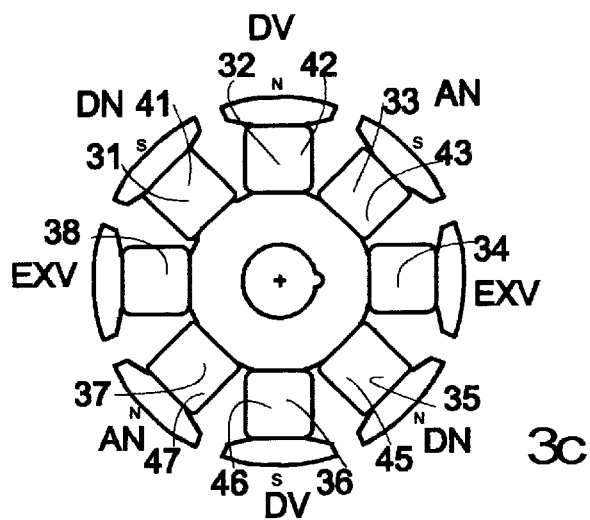

To complete this arrangement, four coils 41, 42, 45 and 46 are placed on the same teeth as the coils 31, 32, 33 and 36 respectively. These coils are connected in such a way that the current coming from a current source 49 (FIG. 5) circulates in the same direction for coils 41 and 46, and in the opposite direction for coils 42 and 45, so that e.g. north poles will appear on the teeth bearing coils 41 and 46 and south poles on the teeth bearing coils 42 and 45 (FIG. 3b). It should be noted that the residual polarisation of the four teeth bearing coils 33, 34, 37 and 38 can be suppressed by additional coils not represented in FIG. 3b.

This arrangement creates considerable crossfeed between the excitation of the vibrations and the detection of said vibrations. This crossfeed could disrupt the electronics, which is why it is preferable to excite the vibrations by using a frequency half the natural frequency of the vibrating cylinder 1. This type of excitation enables the crossfeed at half frequency to be filtered by demodulating the detection signals as a function of the natural frequency of the vibrating cylinder. The same process also provided, in the case of FIG. 3b, for the automatic control of the nodes has the drawback of not being linear, and it is preferable to automatically control the nodes by using a modulation at the natural frequency of the cylinder. To this end, a polarisation must be introduced onto the corresponding teeth AN by means of two coils 43 and 47, so as to have a south pole and a north pole appear there (FIG. 3*c*).

With this gyroscope is associated excitation and automatic control electronics of which the principles are well known.

Figure 5:
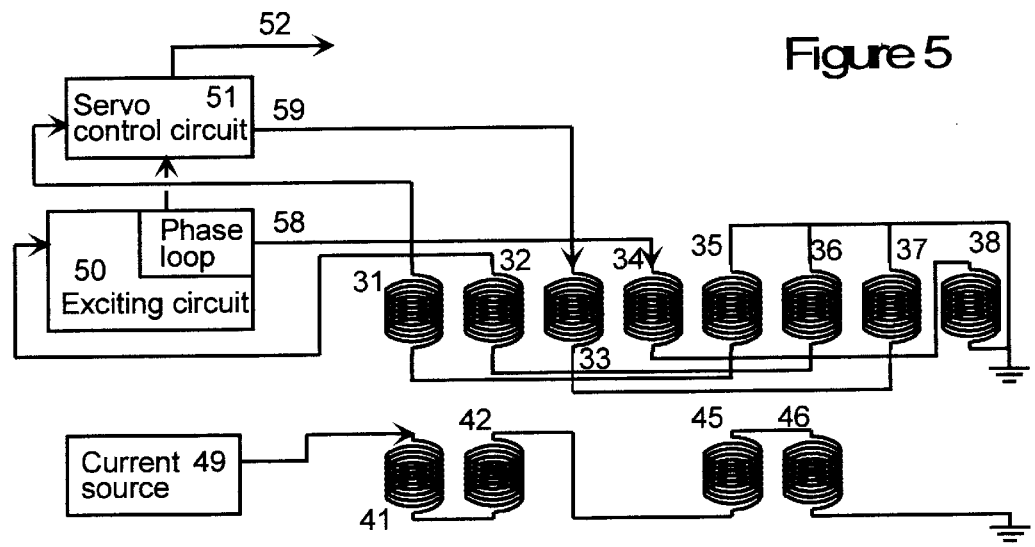
FIG. 5 is a skeleton diagram of the electronic and electric circuits of the vibrating gyroscope according to the invention in a version separating the excitation and detection functions within a same excitation/detection assembly.

FIG. 5 shows a first variation of the connections of the electronics in which the excitation and automatic control are carried out at a frequency half the natural frequency of the vibrating cylinder. It comprises an exciting circuit 50 and a servo-control circuit 51.

The exciting circuit 50 comprises a phase looping oscillator followed by a divider dividing frequency by two. The signals 59 at half frequency coming from this divider, control the non-polarised EXV coils 34 and 38. The cylinder is thus excited at the frequency of the oscillator. When this frequency is equal to the natural frequency of the cylinder, the latter vibrates and induces signals on the vibration detection coils 32 and 36. These signals are retransmitted to the input of the oscillator of said exciting circuit 50 and serve, by way of a phase looping, to bind the frequency thereof to the natural frequency of the vibrating cylinder.

The servo-control circuit 51 receives the signals transmitted by the vibration node detection DN coils 31 and 35, demodulates them and remodulates them at half frequency. The remodulated signals 59 control the node control AN coils 33 and 37 in order to oblige the position of said nodes to remain fixed at the level of the teeth bearing said coils 31, 33, 35 and 37. The demodulated signal, after being subjected to a quadratic compensator, is transmitted to the output 52 and represents the angular speed measured by the gyroscope.

Figure 6:
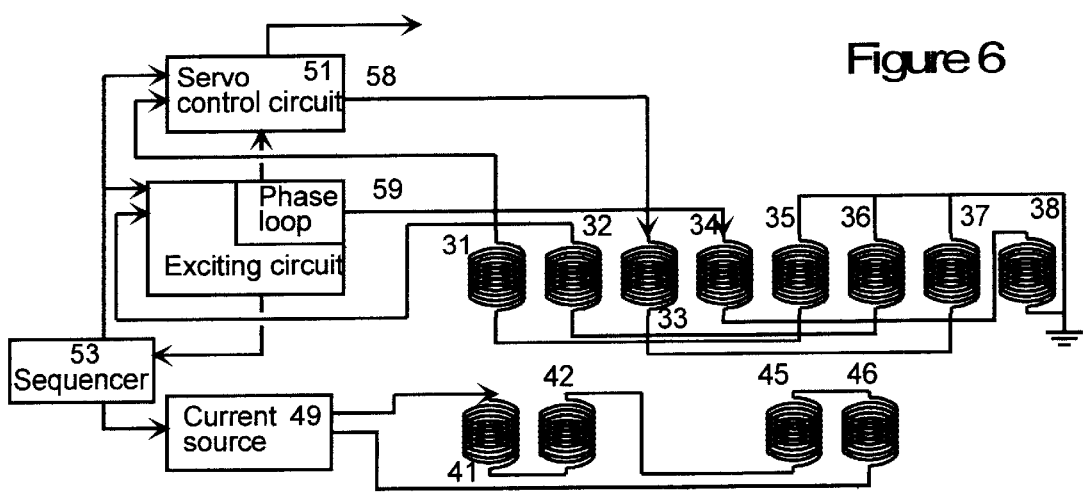
FIG. 6 is a skeleton diagram of another embodiment of the electronic and electric circuits of FIG. 5.

To avoid drifts caused by the hysteresis of materials, it is advantageous to periodically change the polarisation sign of the detection coils. To this end, as shown in FIG. 6, a sequencer 53 triggers, in the current source 49, a periodic reversal of the current in the coils 41, 42, 45 and 46 and simultaneously controls a reversal of the looping phase in the oscillator of the exciting circuit 50 and a reversal of phase of the demodulation of the node detection signals in the servo-control circuit 51. The frequency of the reversal is chosen to preferably be a sub-multiple of the frequency of the oscillator. The sequencer is thus in this case synchronised by the oscillator itself.

Figure 7:
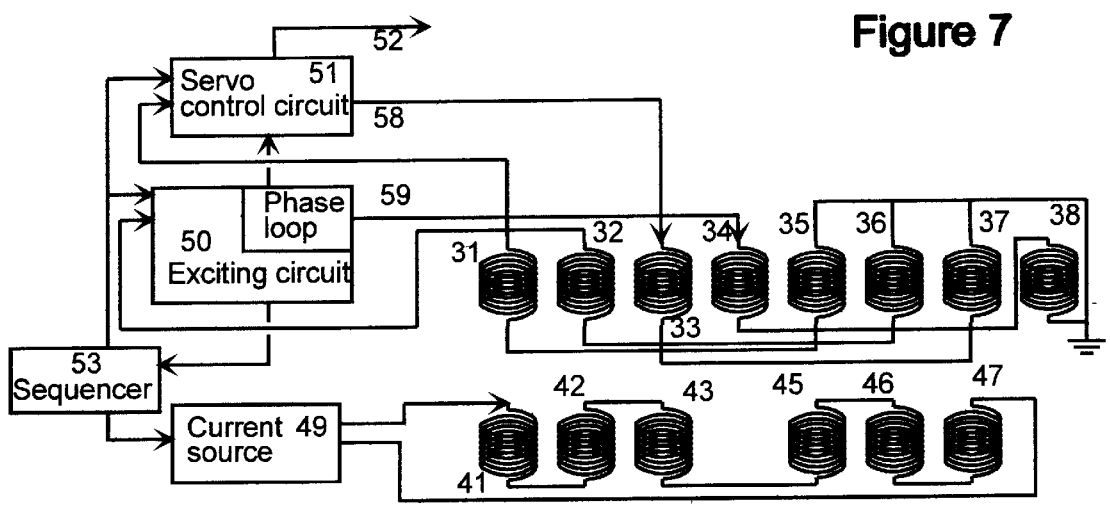
FIG. 7 is a skeleton diagram of another embodiment of the electronic and electric circuits of FIG. 6.

FIG. 7 shows another embodiment of the electronics of FIG. 6 adapted to the configuration of FIG. 3*c* and in which the servo-control circuit 51 remodulates the signal at the natural frequency of the vibrating cylinder. The teeth used for this automatic control are polarised by coils 43 and 47, supplied by the cut source 49 and serialised with the coils 41, 42, 45 and 46. In this case, the quadratic compensator is suppressed and the signal demodulated by the servo-control circuit 51 is sent directly to the output 52 to represent the angular speed of the gyroscope.

Figure 8:
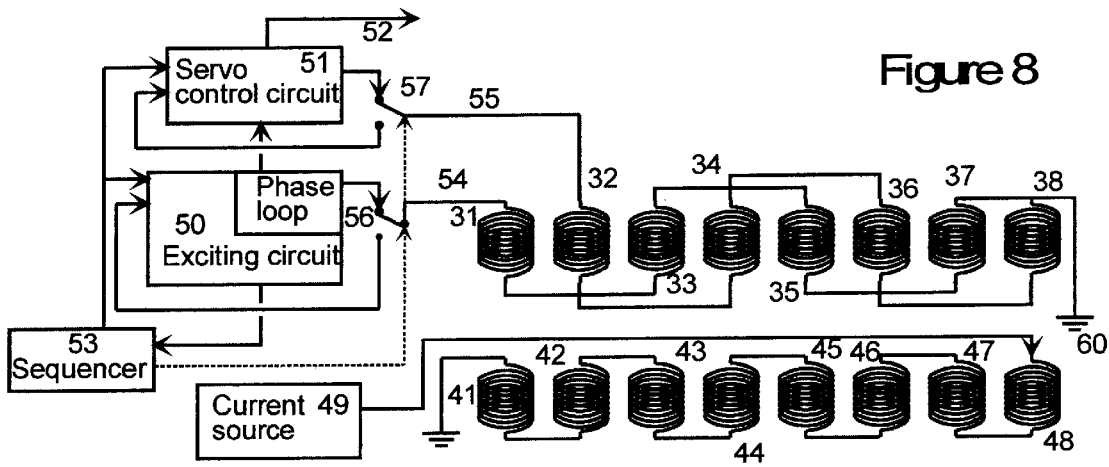
FIG. 8 is a skeleton diagram of the electronic and electric circuits of the vibrating gyroscope according to the invention in the version with multiplexing of its detection and excitation functions.

In a more sophisticated version of the electronics, and to avoid all problems of crossfeed between the excitation and the detection, a multiplexing technique is used (FIG. 8).

Figure 4:
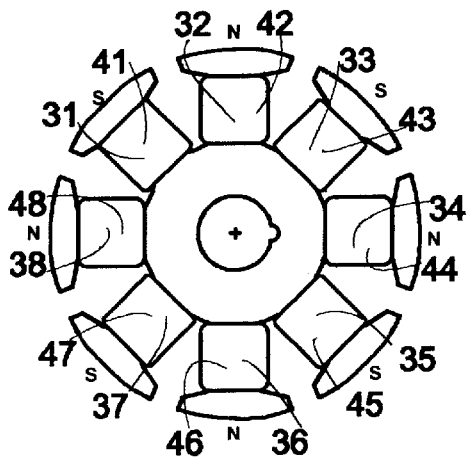
Figure 4:
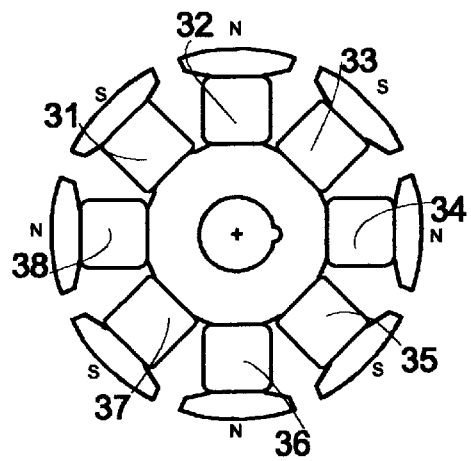

In this solution, the windings are successively used to excite, and then to detect the vibrations and the position of the nodes, The windings are then constituted (FIG. 4*a*) by eight pairs of coils 31 to 38 and 41 to 48, each pair, e.g. 31 and 41, surrounding one of the teeth 26 of the stator, said windings of each pair being superposed or placed side by side, One of the coils of each pair, e.g. 41 to 48, serves to polarise the stator. They are connected in such a way that the current coming from the source of current 29 (FIG. 7) circulates in the same direction for the coils of even-numbered rank and in the opposite direction for the coils of odd-numbered rank, so that alternated north and south poles appear at each of the polar masses 27 (FIG. 4*a*).

The coils 31 to 38 serve to detect and excite the vibrations of the vibrating cylinder. They are serially connected, four by four, the coils of even-numbered rank 32, 34, 36 and 38 together, and the coils of odd-numbered rank 31, 33, 35 and 37 together. The direction of connection of each coil will be such that the signals of two coils, situated at 90 degrees from one another, are subtracted from one another and that, therefore, the signals of two opposite coils are added up.

One of the ends of each of these sets of four coils is connected to an earth 60, the two other ends 54 and 55 being sent to two reversers 56 and 57 controlled by the sequencer 53. These reversers 56 and 57 switch said ends 54 and 55 alternately to the inputs and outputs respectively of the exciting circuit 50 and servo-control circuit 51. The sequencer 53 controls the operation of these two circuits as a function of the position of said reversers 54 and 55.

The operating frequency of the sequencer is a sub-multiple of the natural frequency of the vibration cylinder 1. The cyclical ratio of the switching between the excitation period and the detection period can be 1:1. It can also advantageously be 1:2, 1:3, 1:4 or even less depending on the surge voltage of the vibrating cylinder. Switching from the excitation function to the detection function is preferably carried out at the instant the current in the coils 31 to 38 goes through zero. Switching from the detection function to the excitation function preferably takes place when the control sine wave of the current in said coils passes through zero.

Figure 9:
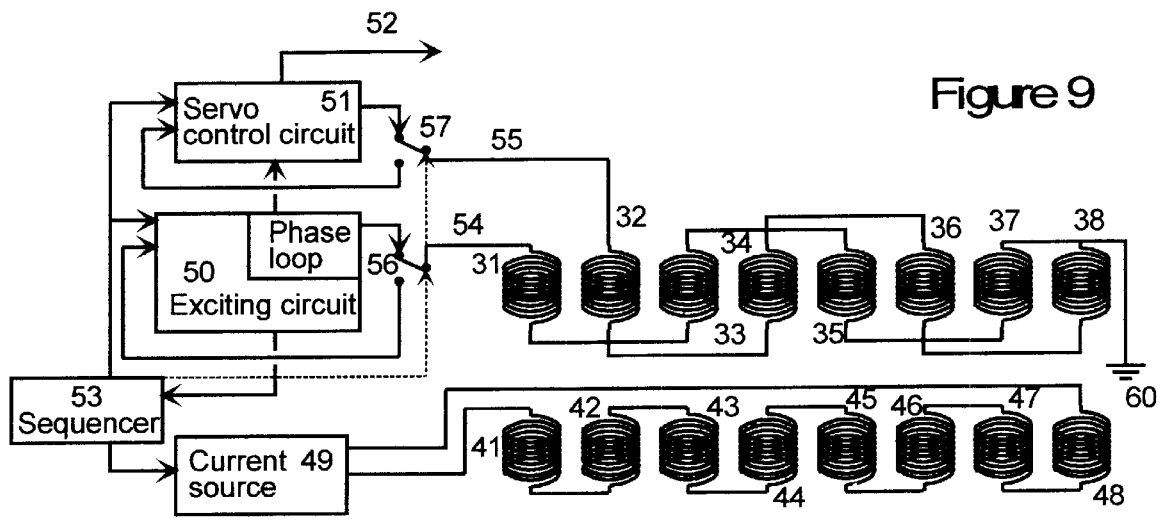
FIG. 9 is a skeleton diagram of another embodiment of the electronic and electric circuits in FIG. 8 in which the polarisation is periodically reversed.

In this solution, and also to avoid drifts due to the hysteresis of the materials, the current in the polarisation coils can be periodically reversed. In this case, the sequencer 53 (FIG. 9) controls, in the current generator 49, the periodic reversal of the coils 41 to 48 and at the same time controls the demodulation and modulation phases of the automatic control circuit 51 as well as the looping phases of the oscillator and the excitation of the vibrations of the exciting circuit 50.

Finally, a last embodiment of the invention (FIG. 4*b*) can be produced by replacing the sheets of metal of the stator by a material forming a permanent magnet and magnetised so as to show a same distribution of the north and south poles as that of FIG. 4*a*. In this case, the coils 41 to 48 and the current supply circuit 49 are suppressed.

It should be noted that, in the multiplexed variations (FIGS. 4, 8 and 9), the stator can be reduced to four teeth or even two teeth provided at least two of these teeth form an angle of 45 degrees.

Figure 10:
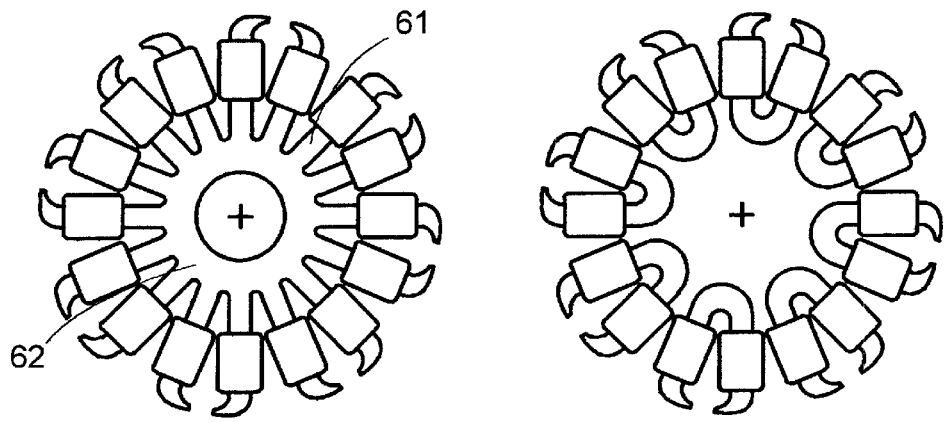
FIG. 10 shows two further embodiments of the magnetic circuit of the vibrating gyroscope according to the invention.

It should also be noted that, especially in the case of non-multiplexed electronics, the utilisation of a 16-tooth stator 62, preferably having dissymmetrical polar masses 61, as shown in FIG. 10*a*, can enable crossfeed phenomena to be reduced without departing from the scope of the invention. Separation of the detection and excitation channels can be further accentuated by separating the 16 teeth into eight elementary magnetic circuits 63 (FIG. 10*b*). In both these cases, the 16 coils for polarisation, on the one hand, and for excitation or detection, on the other hand, can be placed on each of the 16 teeth, or better, separated themselves into two and placed two by two on each of the teeth. In this configuration, and in order to simplify the gyroscope, it is possible to use just one of the two elementary magnetic circuits in a variation with multiplexed electronics. Four elementary magnetic circuits are needed in the version using frequency division.

It should also be noted that, in all the embodiments of the invention described above, the coils placed serially can be placed in parallel or even used separately or in pairs in order to establish redundancies, for instance.

It should finally be noted that the excitation and detection device can be applied, by adapting its shape, to any other form of vibrating body, without departing from the scope of the invention.

What is claimed is:

1. A vibrating gyroscope of the type comprising a thin vibratory element having a revolution shape, an excitation means generating vibrations on at least one point of said vibrating element so as to generate on said vibrating element, a succession of vibrating nodes and bulges moving as a function of an angular rotation speed of said gyroscope, means for detecting said nodes and/or said bulges, wherein said excitation means and said detection means comprise a common electromagnetic stator formed by sheets of metal having at last four teeth and coils respectively wound about said teeth.

2. Vibrating gyroscope according to claim 1, wherein said vibratory element comprises a vibrating cylinder, having an open end inside which is placed said electromagnetic stator.

3. Vibrating gyroscope according to claim 2, wherein the electromagnetic stator comprises eight teeth.

4. Vibrating gyroscope according to claim 3, comprising a plurality of pairs of teeth, each of said pair having two teeth which are placed at an angle of 180 degrees from one another, the pairs of teeth fulfilling the functions of excitation of the vibrations and detection of the vibration bulges being positioned at an angle of 90 degrees from one another and at 45 degrees from the two other pairs fulfilling functions of detection and automatic control of the vibration nodes, the teeth of the vibration bulge detection and vibration node detection functions being polarised by means of additional polarisation coils supplied with current by a current source.

5. Vibrating gyroscope according to claim 1, wherein said electromagnetic stator comprises magnetic sheets of metal having a number of teeth that is a multiple of two, of which two at least form an angle which is an odd-numbered multiple of 45 degrees, ended by polar masses, said teeth being surrounded by coils of insulated conducting wire, each of said teeth fulfilling either a vibration excitation function and a vibration bulge detection function, or a vibration node detection function and a vibration node automatic control function, said coils of insulated conducting wire being alternately and periodically connected, to the input and then to the output of a phase looping oscillator, and to the input and then to the output of a vibration node servo-control circuit.

6. Vibrating gyroscope according to claim 4, wherein said excitation and detection stator comprises first and second set of four teeth, the teeth of the first set being located at 90 degrees from one another, the teeth of these two sets being respectively fitted with eight respective coils serially connected and supplied by a current source, the teeth of said first set respectively bearing a first assembly of four supplemental coils serially mounted and alternately and periodically connected to an exciting circuit comprising a phase looping oscillator, the tea of said second set being located at 45 degrees with respect to the teeth of the first set and bearing four other supplemental coils serially mounted arid alternately and periodically connected to a vibration node servo-control circuit.

7. Vibrating gyroscope according to claim 4, which comprises means for periodically reversing the current passing through said polarisation coils.

8. Vibrating gyroscope according to claim 5, wherein the stator is comprised of a permanently magnetised magnetic material.

9. Vibrating gyroscope according to claim 2, wherein the stator comprises at least two pairs of dissymmetrical teeth.

10. Vibrating gyroscope according to claim 1, wherein said sheets of metal have a multiple of four teeth and said stator comprises coils respectively wound about said teeth.

* * * * *